United States Patent
Roy et al.

(10) Patent No.: US 10,120,104 B2
(45) Date of Patent: Nov. 6, 2018

(54) DOWNHOLE SURVEILLANCE

(71) Applicant: OPTASENSE HOLDINGS LIMITED, Farnborough, Hampshire (GB)

(72) Inventors: James Roy, Calgary (CA); Carson Laing, Calgary (CA)

(73) Assignee: Optasense Holdings Limited (GB)

( * ) Notice: Subject to any disclaimer, the term of this patent is extended or adjusted under 35 U.S.C. 154(b) by 0 days.

(21) Appl. No.: 15/121,441

(22) PCT Filed: Mar. 31, 2015

(86) PCT No.: PCT/GB2015/050985
§ 371 (c)(1),
(2) Date: Aug. 25, 2016

(87) PCT Pub. No.: WO2015/150782
PCT Pub. Date: Oct. 8, 2015

(65) Prior Publication Data
US 2016/0363694 A1    Dec. 15, 2016

(30) Foreign Application Priority Data
Mar. 31, 2014    (GB) .................................... 1405747.5

(51) Int. Cl.
*G01V 1/46*    (2006.01)
*G01H 9/00*    (2006.01)
(Continued)

(52) U.S. Cl.
CPC ............ *G01V 11/00* (2013.01); *E21B 47/123* (2013.01); *E21B 47/14* (2013.01); *G01H 9/004* (2013.01);
(Continued)

(58) Field of Classification Search
CPC . G01H 9/004; G01V 1/30; G01V 1/46; G01V 11/00; G01V 1/40; G01V 1/003;
(Continued)

(56) References Cited

U.S. PATENT DOCUMENTS

2005/0001623 A1 * 1/2005 Hanstein .................. G01V 3/28
324/336

FOREIGN PATENT DOCUMENTS

EP    2386881    11/2011
GB    2442745    4/2008
(Continued)

*Primary Examiner* — Daniel L Murphy
(74) *Attorney, Agent, or Firm* — McDonnell Boehnen Hulbert & Berghoff LLP

(57) ABSTRACT

Methods and apparatus for surveillance of a downhole environment: the response of least one optical fiber to an acoustic impulse is sampled and processed to provide an indication of the acoustic signals detected by at least one longitudinal sensing portion of the fiber(s). The data comprises data indicative of at least one characteristic of the acoustic impulse and data indicative of the downhole environment. The data indicative of at least one characteristic of the acoustic impulse is used to interpret the data indicative of the downhole environment to provide an indication of at least one characteristic of the downhole environment. For example, the data indicative of at least one characteristic of the acoustic impulse may provide a 'signature' of the impulse, which may be used to deconvolve the data indicative of the downhole environment to provide an indication of at least one characteristic of the downhole environment.

18 Claims, 2 Drawing Sheets

(51) Int. Cl.
*G01V 11/00* (2006.01)
*G01V 1/30* (2006.01)
*G01V 1/40* (2006.01)
*E21B 47/12* (2012.01)
*E21B 47/14* (2006.01)
*G01V 1/00* (2006.01)

(52) U.S. Cl.
CPC ............... *G01V 1/30* (2013.01); *G01V 1/40* (2013.01); *G01V 1/46* (2013.01); *G01V 1/003* (2013.01); *G01V 2210/1299* (2013.01); *G01V 2210/1429* (2013.01)

(58) Field of Classification Search
CPC .... G01V 2210/1299; G01V 2210/1429; E21B 47/14; E21B 47/123
USPC .......................................................... 367/25
See application file for complete search history.

(56) References Cited

FOREIGN PATENT DOCUMENTS

| | | |
|---|---|---|
| WO | WO 2010 123566 | 10/2010 |
| WO | WO 2012 082488 | 6/2012 |
| WO | WO 2012 123760 | 9/2012 |
| WO | WO 2012 137021 | 10/2012 |
| WO | WO 2012 137022 | 10/2012 |
| WO | WO 2013 032687 | 3/2013 |

\* cited by examiner

DOWNHOLE SURVEILLANCE

FIELD OF THE INVENTION

The present invention relates to methods and apparatus for downhole surveillance of wells, and in particular but not exclusively, to downhole surveillance in and/or around a well.

BACKGROUND OF THE INVENTION

As will be familiar to the skilled person, wells are used to extract resources such as oil, gas, bitumen, etc. from buried reservoirs.

In general, and as the skilled person is aware, gathering information about the physical environment within and surrounding a well is useful both in terms of understanding what level of reserves are present and ensuring that the reserves are recovered in an efficient, effective and economical manner. Therefore, geophysical surveying, including seismic surveying, is usually carried out at various times throughout well development and use. While traditionally such surveying was carried out using geophones or hydrophones (use of which is generally restricted to observation wells), fibre optic sensors are becoming a well-established technology for a range of applications. This includes the use of downhole fibres, which can be placed while the well is being constructed and remain in place throughout the lifecycle of the well, and are interrogated with optical radiation when information is required. Such fibres are robust and versatile, and are capable of operating in environments which would damage or destroy geophones and hydrophones.

The fibres may contain sensor portions (for example, Fibre Bragg Gratings (FBGs) can be used to form interferometers used to monitor strain in the fibre portion between the two FBGs) or may operate as distributed fibre optic sensors, such as Distributed Acoustic Sensor (DAS) fibres, in which the intrinsic scattering sites within the fibre provide a backscatter return signal.

In DAS sensing, a single length of (typically single mode) fibre which can be unmodified, in the sense of being free of any mirrors, reflectors, gratings, or (absent any external stimulus) any change of optical properties along its length can be used. One example of a DAS fibre is described in GB2442745, the content of which is hereby incorporated by reference. Such a sensor may be seen as a fully distributed or intrinsic sensor as it uses the intrinsic scattering processes inherent in an optical fibre and thus distributes the sensing function throughout the whole of the optical fibre. Further examples are provided by WO2012/137021 and WO2012/137022. The content of these three applications is incorporated herein to the fullest extent possible.

WO2012/123760 is an application which describes the use of fibre optics in seismic surveying, and is incorporated herein to the fullest extent possible.

The skilled person will be aware of multiple bore systems. There are various circumstances in which two or more well bores are provided in relative proximity in a well system. For example, in order to extract oil efficiently from certain oil fields, in particular those which contain viscous oil or bitumen deposits, steam is sometimes used usually with the primary purpose of increasing the temperature of the deposit (thereby lowering its viscosity), in large part by transferring heat as the steam condenses. For example, in Steam Assisted Gravity Draining (SAGD), when a reservoir containing a viscous resource deposit has been identified and geology allows, two bores are drilled, both with horizontal sections in the reservoir, an upper shaft running above a lower shaft. To allow thick, tar-like resources to flow, steam is injected through the upper shaft (and also, in some wells, initially through the lower shaft) causing the resource to heat up, liquefy and drain down into the area of the lower shaft, from which it is removed.

Other related techniques are 'steam flooding' (also known as 'continuous steam injection'), in which steam is introduced into the reservoir though (usually) several injection well shafts, lowing the viscosity, and also, as the steam condenses to water, driving the oil towards a production well shaft.

However, as will be appreciated by the skilled person, there are various other circumstances in which multiple bores are advantageous, be that vertical, horizontal or so called 'directional' wellbores. For example, such systems can provide effective access to a hydrocarbon resource whilst concentrating the above-ground infrastructure to a relatively localised area. In some examples, observation wells are drilled in relatively close proximity to other wellbores and which are used to conduct (amongst other things) seismic surveying.

There remains a need to accurately and conveniently provide downhole surveying, both in single and multiple bore wells.

SUMMARY OF THE INVENTION

According to one aspect of the present invention there is provided a method of surveillance of a downhole environment comprising: providing an acoustic impulse, interrogating at least one optical fibre arranged along the path a well bore with optical radiation; sampling data gathered from said at least one fibre in response to the acoustic impulse; and processing said data to provide an indication of the acoustic signals detected by at least one longitudinal sensing portion of said fibre, wherein the data comprises (i) data indicative of at least one characteristic of the acoustic impulse and (ii) data indicative of the downhole environment and the method comprises using the data indicative of at least one characteristic of the acoustic impulse to interpret the data indicative of the downhole environment to provide an indication of at least one characteristic of the downhole environment.

The data may be sampled or processed such that, at least substantially, only signals directly incident from the impulse source (rather, than, for example, than those reflected within the downhole environment) are used as the data indicative of at least one characteristic of the acoustic impulse. Such data may effectively provide a 'signature' of one or more characteristics of the impulse, rather than an indication of the downhole environment. The data indicative of downhole environment can be considered effectively as a convolution of the impulse, which can therefore be de-convolved using the 'signature' to provide an indication of at least one characteristic of the downhole environment.

Therefore, in one example, the data indicative of at least one characteristic of the acoustic impulse is preferably at least substantially free of convolutions to the impulse imparted by the downhole environment, and the data indicative of downhole environment includes such convolutions.

Alternatively or additionally, the data indicative of at least one characteristic of the acoustic impulse preferably at least substantially excludes data relating to the response of the fibre to reflections of the acoustic signal from within the downhole environment. Data indicative of downhole environment may include such reflections.

In one example, the data indicative of at least one characteristic of the acoustic impulse may comprise data sampled in a first time interval and the data indicative of downhole environment may be sampled in a second time interval, which may be, or at least start, later than the first time interval.

The characteristic(s) of the impulse determined may comprise one or more of the location of the impulse, the strength of the impulse, the frequency of the impulse, the bandwidth of the impulse, the time of the impulse etc. As will be appreciated by the skilled person, the data comprising data indicative of at least one characteristic of the acoustic impulse and/or the data indicative of downhole environment may be collected in predetermined time intervals or from predetermined fibre portions. However, in other examples, a dataset may be gathered and analysed to determine which of the data within the dataset may comprise data indicative of at least one characteristic of the acoustic impulse and/or the data indicative of downhole environment, and such data may thereby be selected from the gathered dataset. This may be convenient as it allows a variable acoustic source, or a source with unknown or unreliable characteristics, to be used.

The acoustic impulse may be provided 'downhole'.

In some examples, the data indicative of at least one characteristic of the acoustic impulse may be gathered from a first fibre portion, and the data indicative of downhole environment may be gathered from a second fibre portion. In one such example, the first fibre may be closer to the source of the acoustic impulse than the second fibre portion. Indeed, the first fibre portion may be located in a first fibre, and the second fibre portion may be located in a second fibre. The first fibre may be arranged to be relatively closer to the source of the acoustic impulse than the second fibre. For example, the acoustic impulse may be arranged to act in close proximity to (or even from) the same bore as that which the first fibre is arranged along, and the second fibre may be arranged along a second bore. The data from the first fibre/fibre portion may therefore provide the 'signature' of characteristic(s) of the impulse, rather than an indication of the downhole environment. The first fibre/fibre portion thereby may be arranged to record the impulse, and the second fibre/fibre portion records a convolution of the impulse (although it will be appreciated from the foregoing that the first fibre/fibre portion can also record the convolution of the impulse by capturing, for example, reflections of the acoustic impulse), wherein the convolution is due to the downhole environment. An impulse signature thus obtained from the first fibre/fibre portion can be used to deconvolve the acoustic readings at second fibre.

The method may be a method of distributed acoustic sensing.

According to one aspect of the present invention there is provided a method of surveillance of a downhole environment in a multiple bore well system comprising: providing an acoustic impulse, interrogating a first and second optical fibre arranged along the path of each of a first and second bore with optical radiation; sampling data gathered from said fibres in response to the acoustic impulse; and processing said data to provide an indication of the acoustic signals detected by at least one longitudinal sensing portion of said fibre, wherein the data gathered from the first optical fibre is used to interpret the data gathered from the second optical fibre to provide an indication of at least one characteristic to the downhole environment.

According to another aspect of the present invention, there is provided apparatus for surveillance of a downhole environment comprising
  (i) at least one acoustic source for providing an acoustic impulse;
  (ii) at least one optical fibre arranged, in use, to be installed along the path of at least one well bore;
  (iii) an optical interrogator for interrogating the at least one fibre with optical radiation; and for sampling data gathered from said fibre in response to the acoustic impulse;
  (iv) processing circuitry for processing said data to provide an indication of the acoustic signals received at at least one longitudinal sensing portion of the at least one fibre in response to an acoustic impulse wherein the data comprises (a) data indicative of at least one characteristic of the acoustic impulse, and (b) data indicative of the downhole environment, and for using the data indicative of at least one characteristic of the acoustic impulse to process the data indicative of the downhole environment to provide an indication of at least one characteristic of the downhole environment.

The invention extends to methods, apparatus and/or use substantially as herein described with reference to the accompanying drawings.

Any feature described in relation to one aspect of the invention may be applied to other aspects of the invention, in any appropriate combination. In particular, method aspects may be applied to apparatus aspects, and vice versa.

DESCRIPTION OF THE DRAWINGS

The invention will now be described by way of example only with respect to the accompanying drawings, of which.

DESCRIPTION OF THE INVENTION

Figure 1:
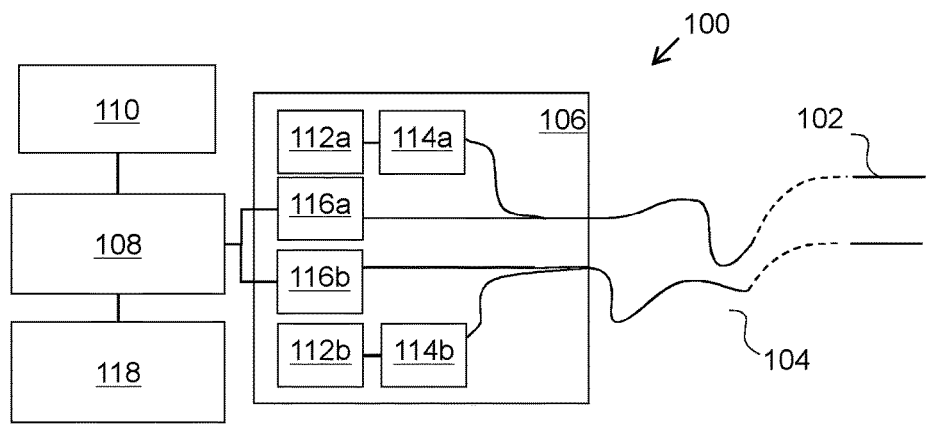
FIG. 1 illustrates components of a distributed acoustic sensor used in embodiments of the present invention.

FIG. 1 shows a schematic representation of a distributed fibre optic sensing apparatus 100. Two lengths of sensing fibre 102, 104 are removably connected at one end to an interrogator 106. The output from the interrogator 106 is passed to a signal processor 108, which may be co-located with the interrogator 106 or may be remote therefrom, and optionally a user interface/graphical display 110, which in practice may be realised by an appropriately specified PC. The user interface 110 may be co-located with the signal processor 108 or may be remote therefrom.

The sensing fibres 102, 104 can be many kilometers in length, for example at least as long as the depth of a wellbore which may typically be around 1.5 km long. In this example, the sensing fibre is a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost, readily available fibre may be used. However in some embodiments the fibre may comprise a fibre which has been fabricated to be especially sensitive to incident vibrations, or indeed may comprise one or more point sensors or the like. In addition, the fibres may be coated with a coating to better suit use in high temperature wells. In use the fibres 102, 104 are deployed to lie along the length of a wellbore, such as in a production or injection well shaft as will be described in relation to FIG. 2 below.

As the skilled person is aware, Distributed acoustic sensing (DAS) offers an alternative form of fibre optic sensing to point sensors, whereby a single length of longitudinal fibre is optically interrogated, usually by one or more input pulses, to provide substantially continuous sensing of vibrational activity along its length. Optical pulses are launched into the fibre and the radiation backscattered from within the fibre is detected and analysed. By analysing the radiation Rayleigh backscattered within the fibre, the fibre can effectively be divided into a plurality of discrete sensing portions which may be (but do not have to be) contiguous. Within each discrete sensing portion mechanical vibrations of the fibre, for instance from acoustic sources, cause a variation in the amount of radiation which is backscattered from that portion. This variation can be detected and analysed and used to give a measure of the intensity of disturbance of the fibre at that sensing portion.

Accordingly, as used in this specification the term "distributed acoustic sensor" will be taken to mean a sensor comprising an optic fibre which is interrogated optically to provide a plurality of discrete acoustic sensing portions distributed longitudinally along the fibre and acoustic shall be taken to mean any type of mechanical vibration or pressure wave, including seismic waves. Note that as used herein the term optical is not restricted to the visible spectrum and optical radiation includes infrared radiation and ultraviolet radiation.

Since such a fibre has no discontinuities, the length and arrangement of fibre sections corresponding to a measurement 'channel' is determined by the interrogation of a fibre. These can be selected according to the physical arrangement of the fibre, the nature of the signal to be captured, the well under consideration, the type of monitoring required etc. In this way, the distance along the fibre, or depth in the case of a substantially vertical well, and the length of each fibre section, or channel resolution, can readily be varied with adjustments to the interrogator changing the input pulse width and input pulse duty cycle, without any changes to the fibre. Distributed acoustic sensing can operate with a longitudinal fibre of 40 km or more in length, for example resolving sensed data into 10 m lengths. In a typical downhole application a fibre length of a few kilometers is usual, i.e. a fibre runs along the length of the entire borehole and the channel resolution of the longitudinal sensing portions of fibre may be of the order or 1 m or a few meters. The spatial resolution, i.e. the length of the individual sensing portions of fibre, and the distribution of the channels may be varied during use, for example in response to the detected signals, as explained in greater detail below.

In operation, the interrogator 106 launches interrogating electromagnetic radiation, which may for example comprise a series of optical pulses having a selected frequency pattern, into respective sensing fibres 102, 104. The optical pulses may have a frequency pattern as described in GB patent publication GB2,442,745, the contents of which are hereby incorporated by reference thereto. As described in GB2,442,745, the phenomenon of Rayleigh backscattering results in some fraction of the light input into the fibre being reflected back to the interrogator 106, where it is detected to provide an output signal which is representative of acoustic disturbances in the vicinity of the fibre. The interrogator 106 therefore conveniently comprises a first and second laser 112a,b each associated with an optical modulator 114a, b for producing a plurality of optical pulses separated by a known optical frequency difference. The interrogator 106 also comprises a first and second photodetector 116a,b arranged to detect radiation which is Rayleigh backscattered from the intrinsic scattering sites within the fibres 102, 104. In an alternative embodiment, two physically separate interrogators, each containing single laser, optical modulator, and photo detector, could be provided. As further explained below, the/each interrogator may have one or more source of time stamp information (e.g. GPS time clock).

In this example, therefore, each of the fibres 102, 104 has an associated, dedicated optical source and detection apparatus. However, this need not be the case, and some or all of such apparatus may be associated with more than one fibre, for example using time division, characteristic wavelength, characteristic polarisation, etc. to allow the signals from each fibre to be distinguished even if only a single source and/or a single detector is used.

The signals from the photodetectors 116a, 116b are processed by the signal processor 108. The signal processor 108 conveniently demodulates the returned signals based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective path length from a given section of fibre, such as would be due to incident pressure waves causing strain on the fibre, can therefore be detected. Further examples of pulses and processing techniques are provided by WO2012/137021 and WO2012/137022. Further discussion of the processing techniques applied in this example can be found below.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of an optical fibre.

To ensure effective capture of the signal, the sampling speed of the photodetectors 116a, 116b and initial signal processing is set at an appropriate rate. In most DAS systems, to avoid the cost associated with high speed components, the sample rate would be set around the minimum required rate.

The processing circuitry 108 is also associated with a timer 118 which is able to provide a time stamp for data received and also allows for time gating of data as discussed herein after. There may be more than one timer, for example, in the illustrated embodiment, there may be two timers, each associated with one of the fibres.

As mentioned above, the fibres 102, 104 are interrogated to provide a series of longitudinal sensing portions or 'channels', the length of which depends upon the properties of the interrogator 106 and generally upon the interrogating radiation used. The spatial length of the sensing portions can therefore be varied in use, even after the fibre 102, 104 has been installed in a bore, by varying the properties of the interrogating radiation. This is not possible with a convention geophone array, where the physical separation of the geophones defines the spatial resolution of the system. A DAS sensor can offer a spatial length of sensing portions of the order of 10 m.

Figure 2:
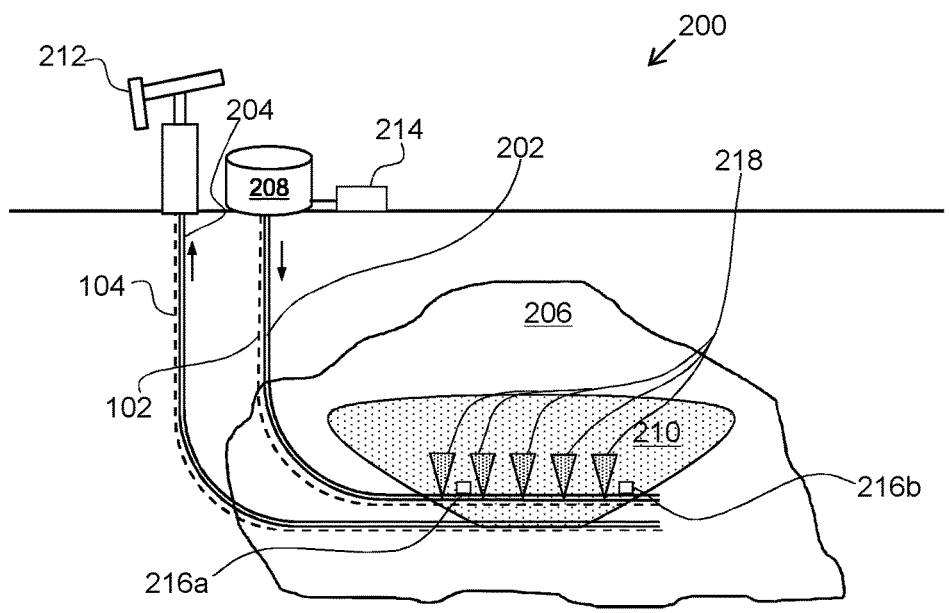
FIG. 2 deployment of a fibre optic distributed acoustic sensor in a Steam Assisted Gravity Draining well.

As the sensing optical fibres 102, 104 are relatively inexpensive, they may be deployed in a wellbore location in a permanent fashion as the costs of leaving the fibres 102, 104 in situ are not significant. The fibres 102, 104 are therefore conveniently deployed in a manner which does not interfere with the normal operation of a well. In some embodiments a suitable fibre may be installed during the stage of well constructions, such as shown in FIG. 2, which shows a Steam Assisted Gravity Drainage (SAGD) well 200, incorporating two sensing fibres 102, 104.

As will be familiar to the skilled person, a SAGD well 200 is formed by drilling two bore holes to serve as an 'injection' shaft 202 and a 'production' shaft 204. Both bore holes have substantially horizontal portions, with the injection shaft 202 being arranged a few meters above the production shaft 204 and substantially parallel thereto. Both horizontal shaft portions run through an underground resource reservoir 206, which in the case of a SAGD well 200 is typically a viscous oil or bitumen reservoir (the term 'oil' as used herein should be understood as including all such resources).

In use of the SAGD well 200, a steam generator 208 is used to generate steam which is released into the reservoir 206 from the horizontal portion of the injection shaft 202. This steam heats the resource within the reservoir 206, decreasing its viscosity. Over time, the steam forms a steam chamber 210, which allows the heated resource to flow to the horizontal portion of the production shaft 204, which collects the resource, which is in turn pumped to the surface by pumping apparatus 212. The apparatus further comprises a controller 214 in association with the injection shaft 202. This controller 214 is arranged to control a first and second acoustic source 216a, 216b, both of which are cemented in place at displaced locations along the injection shaft 202.

As will be familiar to the skilled person, in a SAGD well, steam is introduced through valves, and in this example five individual valves producing five distinct plumes of steam 218 into the chamber 210 are illustrated. Such a well may comprise slide valves, such as are described in WO2012/082488 and WO2013/032687 (incorporated by reference herein) in the name of Halliburton, which also produces a commercial product known as the sSteam™ Valve. However, it will be appreciated single slot systems are also known and could be used, and/or that, in a real system, fewer or more likely more, perhaps many more, valves may be provided.

As will be familiar to the skilled person, while the arrangement above is fairly typical, variations are known, such as using the production shaft 204 to introduce steam at least in the initial stages of heating. Further, there are other situations where multiple bores may be provided relatively close to one another, including multiple horizontal, vertical or 'directional' wellbores, which term describes bores which are not horizontal or vertical, and combinations thereof. They may comprise combinations of observation bores, production bores, injection bores and the like. A steam injection well is described herein purely for the purpose of illustration and the principles now described could be utilised in single bore or other multi-bore well systems.

Such shafts 202, 204 are usually formed by drilling a bore hole and then forcing sections of metallic casing down the bore hole. The various sections of the casing are joined together as they are inserted to provide a continuous outer casing. After the production casing has been inserted to the depth required, the void between the borehole and the casing is backfilled with cement, at least to a certain depth, to prevent any flow other than through the well itself. In this example, each of the injection shaft 202 and the production shaft 204 is fitted with a respective optical fibre to be used as a sensing fibre 102, 104. In this example, the fibres 102, 104 are clamped to the exterior of the outer casing as it is being inserted into the borehole. In this way a fibre 102, 104 may be deployed along the entire length of a wellbore and subsequently cemented in place for at least part of the wellbore. It has been found that an optical fibre which is constrained, for instance in this instance by passing through the cement back fill, exhibits a different acoustic response to certain events to a fibre which is unconstrained. An optical fibre which is constrained may give a better response than one which is unconstrained and thus it may be beneficial to ensure that the fibre in constrained by the cement.

Of course, other deployments of optical fibre may be possible however, for instance an optical fibre could be deployed within the outer casing but on the exterior of some inner casing or tubing. Fibre optic cable is relatively robust and once secured in place can survive for many years in the downwell environment.

In this example, the fibre 102 installed on the injection shaft 202 will hereafter be referred to as the proximate fibre 102, due to its relative proximity to the acoustic sources 216, also installed on the injection shaft. The fibre 104 installed on the production shaft 204 will correspondingly hereafter be referred to as the distant fibre 104. The fibres 102, 104 protrude from the well head and are connected to an interrogator 106, which may operate as described above.

The interrogator 106 may be permanently connected to the fibres 102, 104, although it may also be removably connected to the fibres 102, 104 when needed to perform a survey but then can be disconnected and removed when the survey is complete. The fibres 102, 104 though remain in situ and thus are ready for any subsequent survey. The fibres 102, 104 are relatively cheap and thus the cost of a permanently installed fibre is not great. Having a permanently installed fibre in place does however remove the need for any sensor deployment costs in subsequent surveys and removes the need for any well intervention. This also ensures that in any subsequent survey the sensing fibres 102, 104 are located in exactly the same place as for the previous survey. This is convenient for the acquisition and analysis of data at different times to provide a time varying analysis.

Figure 3:
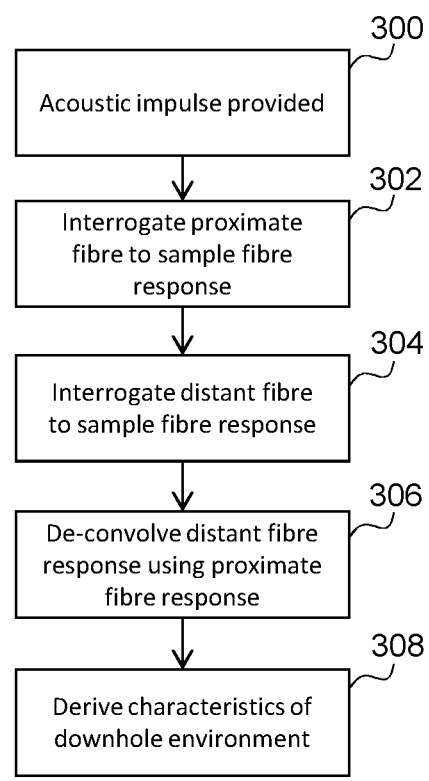
FIG. 3 is a flow chart of a method according to one embodiment of the invention.

FIG. 3 is a flow chart showing steps in the operation of the apparatus. In this example, the apparatus described above is being used to obtain information about the downhole environment. As used herein, the term 'downhole environment' should be taken to include the form (which term includes one or more of the size, shape, density, solid to fluid characteristics) of a steam chamber, where formed, as well as the form of the reservoir and geological formations surrounding and inside the reservoir. Such formations include obstructions in the reservoir, which may be between the two wells, such as shale plugs or mud plugs, and, by consideration of reflection seismics, caprock integrity and the like.

As the method starts therefore, in step 300, an acoustic impulse is provided, in this example from one of the acoustic sources 216. In practice, the method could be carried out repeatedly with different, and/or different combinations of, acoustic sources. The use of different sources which are laterally displaced from one another, while not essential, effectively provides different view points for capturing a downhole environment. For example, the steam chamber 210 may have rock formation therein which effectively place regions thereof 'in shadow' with respect to a first acoustic source, but energy from a second acoustic source may be able to reach, at least partially, behind the formation, and a return obtained therefrom. Multiple sources 216 could therefore provide additional information about a downhole environment.

In step 302, the proximate sensing fibre 102, i.e. the fibre associated with the shaft on/near which the acoustic source is mounted, is then interrogated to determine the response resulting from the acoustic impulse.

Next, in step 304, the distant sensing fibre 104, i.e. the fibre associated with the shaft spaced from that on/near which the acoustic source is mounted, is interrogated to determine the response resulting from the acoustic impulse.

The signals from a given acoustic stimulus can be detected from each of the longitudinal sensing portions of the optical fibre 102, 104 (assuming the signals have not been completely attenuated). Thus it is possible to receive a signal from each sensing portion of fibre 102, 104 along the entire length of the shafts 202, 204 (or at least the horizontal portion thereof). The result will be a series of signals indicating the acoustic/seismic signals detected over time in each longitudinal section of fibre 102, 104. Each sensing fibre 102, 104 thus effectively acts as a series of point seismometers but one which can cover the entire length of the wellbore at the same time, unlike a conventional geophone array. Further as the optical fibres 102, 104 can be installed so as to not interfere with normal well operation, no well intervention is required.

In this example, the response on the proximate fibre 102 is gathered in a short time window following the acoustic impulse. The response may be gathered so as to sample just a subsection of the fibre 102, and/or just over a limited time period so as to obtain a response of at least a portion of the proximate fibre 102 to the acoustic impulse, but to avoid or limit the inclusion in the samples of the response of the fibre 102 to acoustic signals reflected within the downhole environment. This may for example mean using the timer 118 to only process samples obtained in a desired section of fibre in a desired time interval and/or the receiver 114a may be time gated such only those samples obtained in a desired section of fibre in a desired time interval are gathered. Limiting the data in this way effectively provides a 'signature' for the acoustic impulse.

Such a signature could provide an indication of characteristics such as the location, frequency, bandwidth and intensity of the acoustic impulse. Selection of the time at which the data was gathered, and the location from which it was gathered allows control (and preferably limitation or, at least substantially, exclusion) of data including the effects of the reflections of the acoustic impulse from within the downhole environment. It will be also noted that it may possible to obtain a signature from a relatively small portion of fibre.

While time interval and/or fibre portion used to gather such a signature could be defined in advance, it is also possible to gather data from larger or other portions and/or over longer timeframes and determine the appropriate signature therefrom. For example, the signature could provide an indication of the location of the source. The intensity peak is likely to be the closest point in the fibre 102 to the source 216. The time interval/fibre portions for samples which are used to create the signature may be defined with reference to this point. In one example, data may be chosen from a window in which the data remains, to a good approximation, symmetrical to either side of a peak, as this may suggest that the data has not been significantly influenced by the downhole environment. However, other methods could be used. For example, consideration of the speed of the acoustic impulse may allow its progress along the fibre to be tracked. This could allow, for example, only fibre portions which are responding to the impulse to be considered, and only at the time at which the impulse will directly act thereon. In another example, known information about the downhole environment could be used to indicate when the first significant reflections of the impulse are likely to be incident on the fibre 102, and data collected after this time could be disregarded.

As the processing of the data may be adapted to define the sensing portion of interest, DAS sensing is well suited to such an embodiment. However, as noted above, other optical fibre techniques could be used.

The response on the distant fibre 104 may be gathered over a longer time frame, and/or with less constraint in relation to the fibre portions considered, as the signal of interest on that fibre 104 preferably includes acoustic signals returned from features of the downhole environment (e.g. reflected from boundaries therein).

The response of the proximate fibre 102 may then be used, in step 306 to de-convolve the signal detected in the distant fibre 104, as explained below.

As will be appreciated by the skilled person, deconvolution is a mathematical process, which treats the signal of interest as a corruption (or convolution) of an interrogating signal (which in this case is in the acoustic impulse).

At a high level, and ignoring noise, the object of deconvolution is to find a solution for f in a general form convolution equation:

$$f*g=h$$

In the embodiments described herein, h is the signal collected at the distant fibre 104. The signal of interest, f, which is indicative of the downhole environment has been convolved with g, which in this case is the acoustic impulse.

Deconvolution in seismic surveying is known. However, such methods usually require a filter to be estimated as an approximation of the signal applied (g), and used to deconvolve the data, which is often carried out in the frequency domain.

However, in the examples used herein, the effect of the particular acoustic impulse on a fibre 102 has been measured by interrogating the proximate fibre 102. Thus, 'g' is known, or known to a good approximation. Therefore, this can be used to deconvolve the data collected at the distant fibre 104. This has several advantages. For example, it does not matter if the location of the acoustic source is not known (or is not known precisely). Further, repeat surveys may be carried out even if the acoustic source moves, or is inconsistent in effect, as its signature may be acquired in use. In addition, the nature of the acoustic impulse (for example, intensity, bandwidth and the like) is measured by the proximate fibre 102, so need not be known in advance.

In this way, a 'snap shot' of the downhole environment can be obtained (step 308). This may include information about the shape of the reservoir 206, as well as the presence, location and extent of both of geological formations therein, and of the geological formations in which the reservoir 206 lies. It may also provide information about the condition (shape, density, etc) of the steam chamber 210.

For example, there may be a strong acoustic reflection from the boundary between the steam chamber 210 and the fluid in the reservoir 206 or any geological formation within the reservoir 206. This boundary may be readily determined by a pronounced change in the intensity of the returned acoustic signal. The time taken for the signal to reach the boundary and be returned to the distant sensing fibre 104 allows the position of the boundary (and therefore the shape of the chamber 210) to be estimated.

In other examples, phase changes and amplitude changes may also be considered in the signal. The signal may be used to determine aspects of the nature of e.g. geological formations in/around the reservoir, such as an indication of caprock integrity), or viscosity of fluids within the reservoir itself.

Of course, there may be other sources of acoustic noise, which may complicate the signal, but signal processing could reduce such noise. For example, an acoustic background obtained just before and/or after the impulse is introduced, and this could be subtracted from the signal if this proves to be relatively stable, or the impulse could be repeated several times on the assumption that the downhole environment will not change significantly between impulses, and commonalities between such subsequently acquired sample set could be considered and used to derive an estimate of the downhole environment. Such a process is similar to 'seismic stacking', and will result in improved signal to noise ratio. Indeed, impulses could form a sequence, with a given (possibly varying) interval pattern (e.g. analogous to a frequency chirp) or at varying frequencies/bandwidths/intensity, etc, which may allow the response to impulses to be more readily separated from a background noise. Indeed, providing impulses with at least one varying property such as frequency, bandwidth and/or intensity may provide additional information about the downhole environment. For example, a lower intensity impulse may provide more information about the local environment and a stronger impulse may provide more information(s) about the geological formation surrounding the well system.

In the present embodiment, all equipment remains in situ, so gathering repeated readings is relatively simple. Indeed, this also means that, while impulses may be provided in a relatively short space of time to provide data, they may also be provided periodically in a form of time-lapse survey. To that end, it may be desirable to time stamp data using the timer 118. This may comprise a local clock or it may have access to a remote source of time stamp information such as a Global Navigation Satellite System (GNSS) (e.g. GPS or the like).

It may also be the case that there are known rock formations or the like within the reservoir 206, which may, as noted above, mask the true extent of the chamber 210. Therefore, the acoustic data could be combined with other sources of data (such as obtained for seismic surveying of the reservoir 208, or use of seismic interferometry) to assist in building a full picture of the downhole environment.

If multiple acoustic sources 216 are provided, the selection of which are operated could be under the control of an operator, who may seek to specifically resolves ambiguities within the data. However, it could also be done automatically, either intelligently in response to an ambiguity identified by the processor 208, or in a pre-programmed manner, for example, following a predetermined scheme such as operating each source 216 in order along the length of the shaft 202, or in some other combination/sequence. Of course, any combination of these techniques could also be used. Similar comments apply in relation to control of each source, which may be controllable in terms of frequency bandwidth, intensity and the like of the impulse produced thereby.

It may be that the method allows as estimate of a characteristic (e.g. the size or shape shape) of the steam chamber 210, in which case, a comparison may be made with at least one predetermined desired characteristic of the chamber 210. For example, the chamber 210 may be desired to have a generally cone-like shape, tapering towards a narrower bottom end in the regions of the production shaft 204 as shown in FIG. 2. Departures from this desired shape may be identified and the valves of the injection shaft 202 may be controlled to remedy this, for example by increasing steam flow (and therefore heat input) to an area of the steam chamber 210 which is lower than it should be, thus locally growing the steam chamber 210. Alternatively, it may be revealed that the steam chamber 210 has not developed beyond a geological formation, and additional heat could be applied to this area.

The method may also provide advance indication to steam breakthrough, or another disadvantageous state, and result in partially or fully shutting down the well.

Whilst certain schemes for distributed acoustic sensing have been described above, other schemes could be employed, or indeed other fibre optic sensing techniques, such as providing discreet sensors or sensor portions of fibre, could be employed.

Some or all of the steps could be carried out automatically, with the processor 108 providing an input to control the acoustic source controller 214, but in most embodiments, it is likely that at least some of the steps will be carried out under the control of an operator of the well 200.

Various alternatives to the above embodiment will be apparent to the skilled person and are within the scope of this invention. For example, although a SAGD well has been described, the system could be employed in any well, which may be a multi-bore system, or a single bore well, or may be used in relation to bores of one or more separate well systems. While in the example above, the acoustic source 216 and the proximate fibre 102 were embedded in the same shaft, this need not be the case, although it will be appreciated that they are preferably reasonably close to one another as this allows the signature of the impulse to be accurately captured and remain substantially free of convolution due to the downhole environment.

As can also be readily appreciated, the system may also be employed using a single fibre, in particular by time-gating the signals used (perhaps with reference to their distance from the source, and/or the speed of sound) so as to capture a 'signature' of the acoustic impulse and then, at a later time, reflections from the downhole environment to provide data indicative of aspects of that environment. In other words, a single fibre can act as both the proximate and the distant fibres of the above example. The methods of time-gating discussed above apply equally in such an embodiment.

In addition, while steam stimulated wells have been described in detail, in which the downhole environment comprises a steam chamber, this need not be the case in all embodiments.

Although the acoustic sources 216 in this case are in the form of dedicated implusers acting in close proximity to a shaft, alternatives are possible. For example, in one embodiment, the acoustic source could be provided by a pressurised inlet of steam, for example though a controllable valve, as mentioned above. The may be single pulse of steam, or a high pressure pulse within a flow of steam. Each valve may be controlled individually to provide an acoustic source, or valves could be controlled as part of a subset. This may provide an acoustic source which is convenient as it requires no additional apparatus to be installed and, in conjunction with more than one controllable valve, allows the source of an acoustic impulse to move along a shaft. Other suitable acoustical sources include 'sparkers', downhole vibrating units (ie. piezeo sources), air gun sources, and the like. In addition, the above description uses the example of two acoustic sources 216, but the invention could be carried out with one, three or more such acoustic sources, which need not be of the same type.

Further, while in the above description, both sources 216 are provided in close association with one bore, it may be the case that sources are provided on more than one bore. For example, if in the example above, at least one acoustic source was provided on the production shaft 204, the fibres 102 could switch roles, with the fibre 104 associated with the production well 204 acting as the proximate fibre when an acoustic source associated with the production shaft 204 is activated. This would provide additional versatility and provide further information about the downhole environment. Further, such information could be useful in 'cross-well' measurements with other bores in the area, which are perhaps part of other wells.

Of course, additional fibres may be provided, for example on further bores.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of surveillance of a downhole environment in a well comprising: providing an acoustic impulse, interrogating at least one optical fibre arranged along the path a well bore with optical radiation; sampling data gathered from said at least one fibre in response to the acoustic impulse; and processing the sampled data to provide an indication of acoustic signals detected by at least one longitudinal sensing portion of said fibre, wherein the data comprises:
   (i) data indicative of at least one characteristic of the acoustic impulse and
   (ii) data indicative of downhole environment, wherein the data indicative of at least one characteristic of the acoustic impulse is at least substantially free of convolutions to the impulse imparted by the downhole environment, and the data indicative of the downhole environment includes such convolutions and
   the method comprises using the data indicative of at least one characteristic of the acoustic impulse to deconvolve the data indicative of downhole environment to provide an indication of at least one characteristic of the downhole environment.

2. A method of downhole surveillance according to claim 1 in which sampling the data indicative of at least one characteristic of the acoustic impulse comprises at least one of: sampling the data within a determined time interval; and sampling the data from a determined fibre portion; and wherein the sample data is processed so as to comprise an indication of a response to the acoustic impulse which is substantially free of convolution from interactions with the downhole environment.

3. A method of downhole surveillance according to claim 2 in which sampling the data within a determined time interval and sampling the data from a determined fibre portion comprises carrying out the sampling with reference to the time taken for the acoustic impulse to reach the portion when travelling directly from its source.

4. A method of downhole surveillance according to claim 1 comprising selecting at least one of the data indicative of at least one characteristic of the acoustic impulse and the data indicative of downhole environment from a gathered dataset, the method comprising analysing the gathered dataset to identify said data.

5. A method of downhole surveillance according to claim 1 comprising interrogating a first and second optic fibre with optical radiation, wherein the first and second fibres are respectively arranged along the path of a first and second bore; sampling data gathered from said fibres in response to the acoustic impulse; and processing said data to provide an indication of the acoustic signals detected by at least one longitudinal sensing portion of said fibre, wherein the data gathered from the first optical fibre provides data indicative of at least one characteristic of the acoustic impulse and the data gathered from the second optical fibre provides data indicative of downhole environment.

6. A method of downhole surveillance according to claim 5 in which the acoustic impulse is provided in close proximity to the first bore.

7. A method of downhole surveillance according to claim 5 in which gathering the data comprises at least one of time gating the data gathered from the first fibre, and gathering the data from a determined fibre portion so as to provide an indication of the effect of the acoustic impulse on the first fibre which is substantially free of convolution from interactions with the downhole environment.

8. A method of downhole surveillance according to claim 1 in which the step of providing an acoustic impulse comprises providing a downhole acoustic impulse.

9. A method of downhole surveillance according to claim 1 which comprises recording the time at which data is gathered, and repeating the method steps to provide a time lapse survey.

10. A method of downhole surveillance according to claim 1 which comprises providing an acoustic impulse from at least two displaced locations.

11. A method of downhole surveillance according to claim 10 in which the impulses are provided consecutively.

12. A method of downhole surveillance according to claim 1 in which the step of providing an acoustic impulse comprises controlling one or more of an impulser or a steam valve.

13. Apparatus for surveillance of a downhole environment comprising
   (i) at least one acoustic source for providing an acoustic impulse;
   (ii) at least one optical fibre arranged, in use, to be installed along the path of at least one well bore;
   (iii) an optical interrogator for interrogating the at least one fibre with optical radiation; and for sampling data gathered from said fibre in response to an acoustic impulse;
   (iv) processing circuitry for processing said sampled data to provide an indication of acoustic signals received at at least one longitudinal sensing portion of the at least one fibre in response to an acoustic impulse wherein the data comprises
   i. data indicative of at least one characteristic of the acoustic impulse and ii. data indicative of downhole environment, wherein the data indicative of at least one characteristic of the acoustic impulse is at least substantially free of convolutions to the impulse imparted by the downhole environment, and the data indicative of the downhole environment includes such convolutions and for using the data indicative of at least one characteristic of the acoustic impulse to deconvolve the data indicative of downhole environment to provide an indication of at least one characteristic of the downhole environment.

14. Apparatus according to claim 13 for surveillance of a multiple well bore system, comprising first and second optical fibres, arranged, in use, to be installed along the path of each of a first and second well bore, and in which the first fibre is arranged, in use, such that at least a portion thereof is sufficiently close to at least one acoustic source so as to receive an indication of the effect of the acoustic impulse on the first fibre which is substantially free of convolution from interactions with the downhole environment.

15. Apparatus according to claim 13 in which at least one acoustic source is arranged, in use, within or in proximity to a well bore.

16. Apparatus according to claim 13 which comprises a timer arranged to gate the data sampled such that only data within a determined time interval is processed, or data received from a determined fibre portion is processed or both data within a determined time interval and data received from a determined fibre portion is processed.

17. Apparatus according to claim 13 which comprises at least two mutually displaced acoustic sources.

18. Apparatus according to claim 13 in which at least one acoustic source comprises one or more of an impulser and a steam valve.

* * * * *